US011131313B2

(12) United States Patent
Nejedly et al.

(10) Patent No.: US 11,131,313 B2
(45) Date of Patent: Sep. 28, 2021

(54) SINGLE-STAGE COMPRESSOR WITH BLEED SYSTEM FOR THRUST LOAD ALLEVIATION

(71) Applicant: Garrett Transportation I Inc., Torrance, CA (US)

(72) Inventors: Milan Nejedly, Brno (CZ); Ryoken Matsuzaki, Torrance, CA (US); Jeffrey Lotterman, Los Angeles, CA (US)

(73) Assignee: GARRETT TRANSPORTATION I INC, Torrance, CA (US)

( * ) Notice: Subject to any disclaimer, the term of this patent is extended or adjusted under 35 U.S.C. 154(b) by 167 days.

(21) Appl. No.: 16/409,568

(22) Filed: May 10, 2019

(65) Prior Publication Data

US 2020/0355192 A1    Nov. 12, 2020

(51) Int. Cl.
| F04D 29/04 | (2006.01) |
| F04D 27/00 | (2006.01) |
| F04D 19/00 | (2006.01) |
| F04D 29/046 | (2006.01) |

(52) U.S. Cl.
CPC ......... *F04D 27/009* (2013.01); *F04D 19/002* (2013.01); *F04D 29/046* (2013.01)

(58) Field of Classification Search
None
See application file for complete search history.

(56) References Cited

U.S. PATENT DOCUMENTS

| 2006/0263200 | A1 | 11/2006 | Ahlroth et al. |
| 2013/0315718 | A1* | 11/2013 | Parker ............... F02B 37/22 415/157 |
| 2015/0016981 | A1 | 1/2015 | Sano et al. |
| 2015/0240656 | A1* | 8/2015 | Ehrhard ............ F01D 17/105 415/145 |
| 2015/0308456 | A1* | 10/2015 | Thompson ............ H02K 9/00 417/244 |
| 2016/0265553 | A1* | 9/2016 | Annati ................ F04D 17/06 |
| 2018/0045214 | A1* | 2/2018 | McArdle ............. F01D 5/04 |
| 2019/0048876 | A1* | 2/2019 | Mohtar ............. F04D 29/462 |

FOREIGN PATENT DOCUMENTS

| CN | 105684274 A | 6/2016 |
| JP | 2011202589 A | 10/2011 |

* cited by examiner

*Primary Examiner* — Michael Lebentritt
(74) *Attorney, Agent, or Firm* — Lorenz & Kopf LLP (57) ABSTRACT

A single-stage compressor device includes a housing and a rotating group with a shaft and a compressor wheel. The compressor wheel includes a front face and a back face. The front face cooperates with the housing to define a compressor flow path. A motor drives rotation of the rotating group within the housing. Furthermore, the compressor device includes a bleed system fluidly connected to the compressor flow path and configured to receive bleed fluid from the compressor flow path. The bleed system includes a bleed passage. At least a portion of the bleed passage is cooperatively defined by the back face of the compressor wheel and an opposing surface of the housing. The bleed system is configured to pass bleed air from the bleed passage, thereby alleviating thrust loading of the compressor wheel on the rotating group.

20 Claims, 4 Drawing Sheets

SINGLE-STAGE COMPRESSOR WITH BLEED SYSTEM FOR THRUST LOAD ALLEVIATION

TECHNICAL FIELD

The present disclosure generally relates to a single-stage compressor and, more particularly, relates to a single-stage compressor with a bleed air system for thrust load alleviation.

BACKGROUND

Various systems include a compressor for supplying compressed fluid. For example, fuel cell systems often include a fuel cell compressor for compressing air before it is fed to the fuel cell stack. This can increase operating efficiency of the fuel cell system.

However, conventional compressors may suffer from various deficiencies. For example, some compressors may be too bulky, too heavy, or too complex for some applications. Also, the bearings used in some conventional compressors may be a source of contamination. Furthermore, some compressors may have a load bearing capacity that limits their usefulness and/or operating efficiency.

Thus, it is desirable to provide a compressor that is compact and that is less complex than conventional compressors. Also, it is desirable to provide a compressor bearing that is less likely to contaminate the compressor. Moreover, it is desirable to provide a compressor with higher load bearing capacity than conventional compressors. Other desirable features and characteristics of the present disclosure will become apparent from the subsequent detailed description and the appended claims, taken in conjunction with the accompanying drawings and this background discussion.

BRIEF SUMMARY

In one embodiment, a single-stage compressor device is disclosed that includes a housing. The compressor device also includes a rotating group that includes a shaft and a compressor wheel fixed to the shaft. The compressor wheel includes a front face and a back face. The front face cooperates with the housing to define a compressor flow path. The compressor device also includes a bearing that supports rotation of the rotating group within the housing. Moreover, the compressor device includes a motor that drives rotation of the rotating group within the housing. Furthermore, the compressor device includes a bleed system fluidly connected to the compressor flow path and configured to receive bleed fluid from the compressor flow path. The bleed system includes a bleed passage. At least a portion of the bleed passage is cooperatively defined by the back face of the compressor wheel and an opposing surface of the housing. The bleed system is configured to pass bleed air from the bleed passage, thereby alleviating thrust loading of the compressor wheel on the rotating group.

In another embodiment, a single-stage, motorized compressor device is disclosed that includes a housing and an electric motor housed within the housing. The compressor device also includes a rotating group that includes a shaft and a compressor wheel fixed to the shaft. The rotating group is turbine-less and is configured to be driven in rotation by the motor about an axis of rotation. The compressor wheel includes a front face and a back face. The front face cooperates with the housing to define a compressor flow path. Moreover, the compressor device includes an air bearing that supports rotation of the rotating group within the housing. Additionally, the compressor device includes a bleed system that includes a bleed passage and a return channel. The bleed passage is configured to receive bleed air from the compressor flow path. The return channel is configured to return bleed air back toward the compressor flow path. At least a portion of the bleed passage is cooperatively defined by the back face of the compressor wheel and an opposing surface of the housing.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include a compressor device, such as an e-charger or electric compressor, with a fluid bleed system configured to improve operation of the compressor device. The bleed system may be configured as a bleed air system that helps the rotating group rotate in a balanced and efficient manner. The bleed air system may include one or more fluid passages configured to receive bleed air from the compressor airflow path. The bleed air system may be configured to pass bleed air for alleviating thrust loading of the compressor wheel on the rotating group. Accordingly, the compressor may include a relatively simple bearing, such as an air bearing. This can provide cost savings and other efficiencies without detrimentally affecting performance. Furthermore, the compressor may be configured as a single-stage compressor that is compact and uncomplicated in design and assembly.

Figure 1:
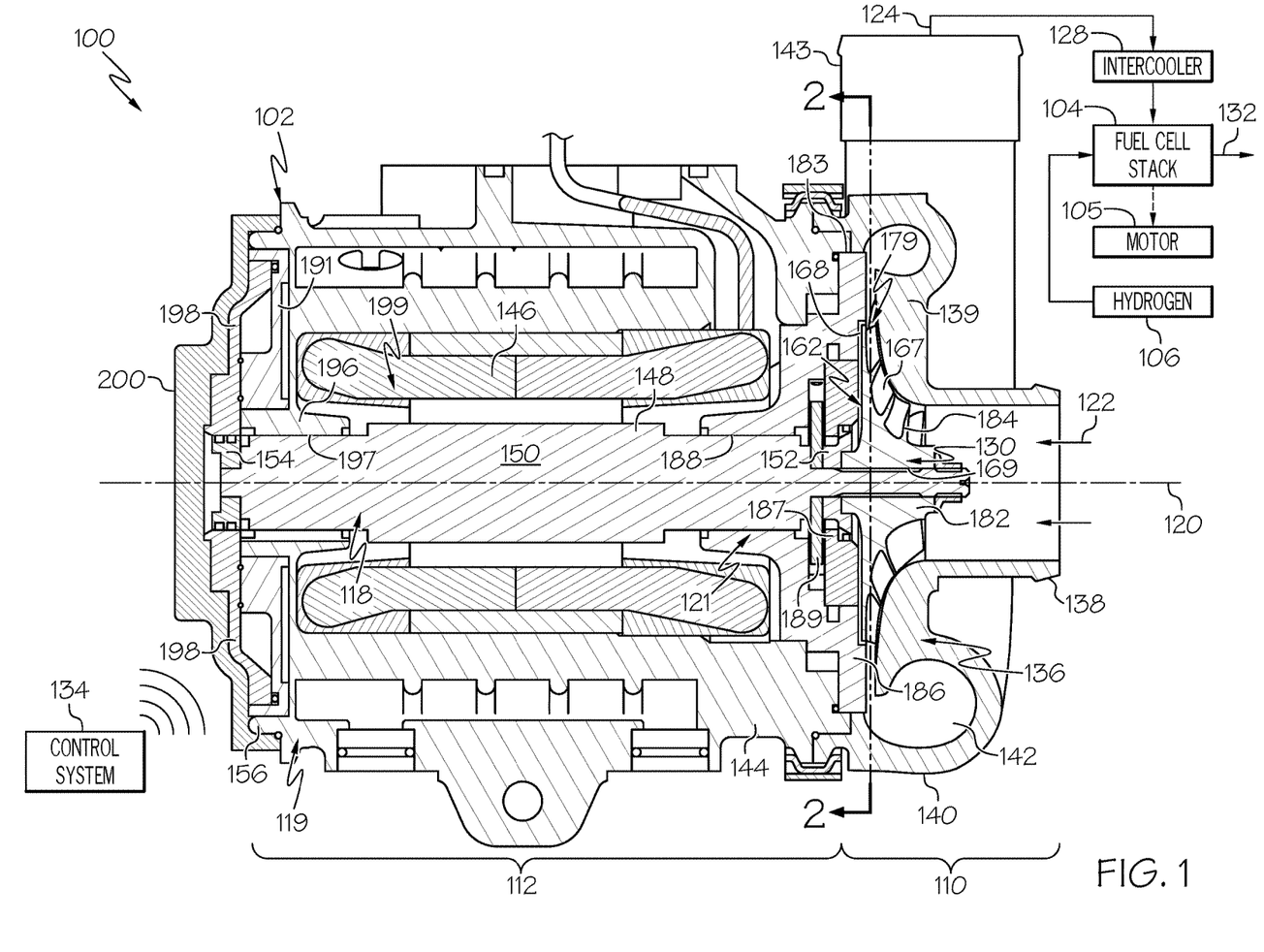
FIG. 1 is a schematic view of a fuel cell system with a charging device according to example embodiments of the present disclosure.

FIG. 1 is a schematic view of a fuel cell system 100 with an example charging device 102 of the present disclosure. In some embodiments, the fuel cell system 100 may be included in a vehicle, such as a car, truck, sport utility vehicle, van, motorcycle, etc. However, it will be appreciated that the fuel cell system 100 may be configured for a different use without departing from the scope of the present disclosure.

The fuel cell system 100 may include a fuel cell stack 104 containing a plurality of fuel cells. Hydrogen may be supplied to the fuel cell stack 104 from a tank 106, and oxygen may be supplied to the fuel cell stack 104 to generate electricity by a known chemical reaction. The fuel cell stack 104 may generate electricity for an electrical device, such as an electric motor 105. As stated, the fuel cell system 100 may be included in a vehicle; therefore, in some embodiments, the electric motor 105 may convert the electrical power to mechanical power to drive and rotate an axle (and, thus, one or more wheels) of the vehicle.

Oxygen may be provided to the fuel cell stack 104, at least in part, by the charging device 102. Thus, the charging device 102 may be configured as an electric compressor device (i.e., electric supercharger) with a single-stage compressor in some embodiments.

As shown in FIG. 1, the charging device 102 may generally include a rotating group 118 and a housing 119 (i.e., compressor housing). The rotating group 118 may include a shaft 150 and various other components that are fixedly supported on the shaft 150 for rotation within the housing 119 by one or more bearings 121. In some embodiments, the bearing(s) 121 may be configured as a plain bearing, an air bearing, and/or an oil-less bearing.

The charging device 102 may define a motor section 112. The motor section 112 may include an electric motor 199 that includes a stator 146 and a rotor 148. The rotor 148 may be fixed to the shaft 150. The stator 146 may be supported and housed within the housing 119 and may drivingly rotate the rotor 148 and other elements of the rotating group 118 about an axis 120.

The charging device 102 may also include a compressor section 110. In some embodiments, the compressor section 110 may be the sole (only) compressor section of the charging device 102. Accordingly, the charging device 102 may be relatively compact. The compressor section 110 may include a compressor wheel 130, which is fixed to a longitudinal end of the shaft 150. Accordingly, the motor 199 may drivingly rotate the compressor wheel 130 about the axis 120 within the housing 119 of the compressor section 110.

Accordingly, an inlet airstream (represented by arrows 122) may be compressed by the compressor section 110, and a compressed airstream (represented by arrow 124) may be directed to an intercooler 128 and then to the fuel cell stack 104 for boosting the operating efficiency of the fuel cell system 100.

Furthermore, an exhaust gas stream (represented by arrow 132) from the fuel cell stack 104 may be exhausted to atmosphere as represented in FIG. 1. Stated differently, the exhaust gas stream 132 may be directed away from the charging device 102. Accordingly, the rotating group 118 may be driven in rotation without the need for a turbine. In other words, the rotating group 118 may be turbine-less and may be driven solely by the electric motor 199 in some embodiments. In other embodiments, the exhaust gas stream 132 may be directed back toward the charging device 102, for example, to drive rotation of a turbine wheel that is fixed to the shaft 150. This may, in turn, drive rotation of the compressor wheel 130, for example, to assist the electric motor 199.

Various components of the fuel cell system 100 may be controlled by a control system 134. The control system 134 may be a computerized system with a processor, various sensors, and other components for electrically controlling operation of the fuel cell stack 104, the motor 199, and/or other features of the system 100. In some embodiments, the control system 134 may define or may be part of the electrical control unit (ECU) of a vehicle.

The charging device 102 may include a bleed system 162 (a bleed air system 162) that manages aerodynamic loads for balanced and efficient rotation of the rotating group 118. The bleed air system 162 may alleviate and/or reduce thrust loads generated by the compressor wheel 130 during operation. Thrust loads would otherwise tend to shift the rotating group 118 axially along the axis 120 relative to the housing 119. However, the bleed system 162 helps maintain the rotating group 118 in a substantially fixed position along the axis 120 (a fixed axial position). The bleed air system 162 allows the bearing(s) 121 to be simplified. For example, one or more bearings 121 may be air bearings in some embodiments. Thus, the charging device 102 may maintain heavy duty operation for long operating lifetimes. Also, the charging device 102 can be manufactured and repaired inexpensively and in a time efficient manner because of the features of the present disclosure.

Figure 2:
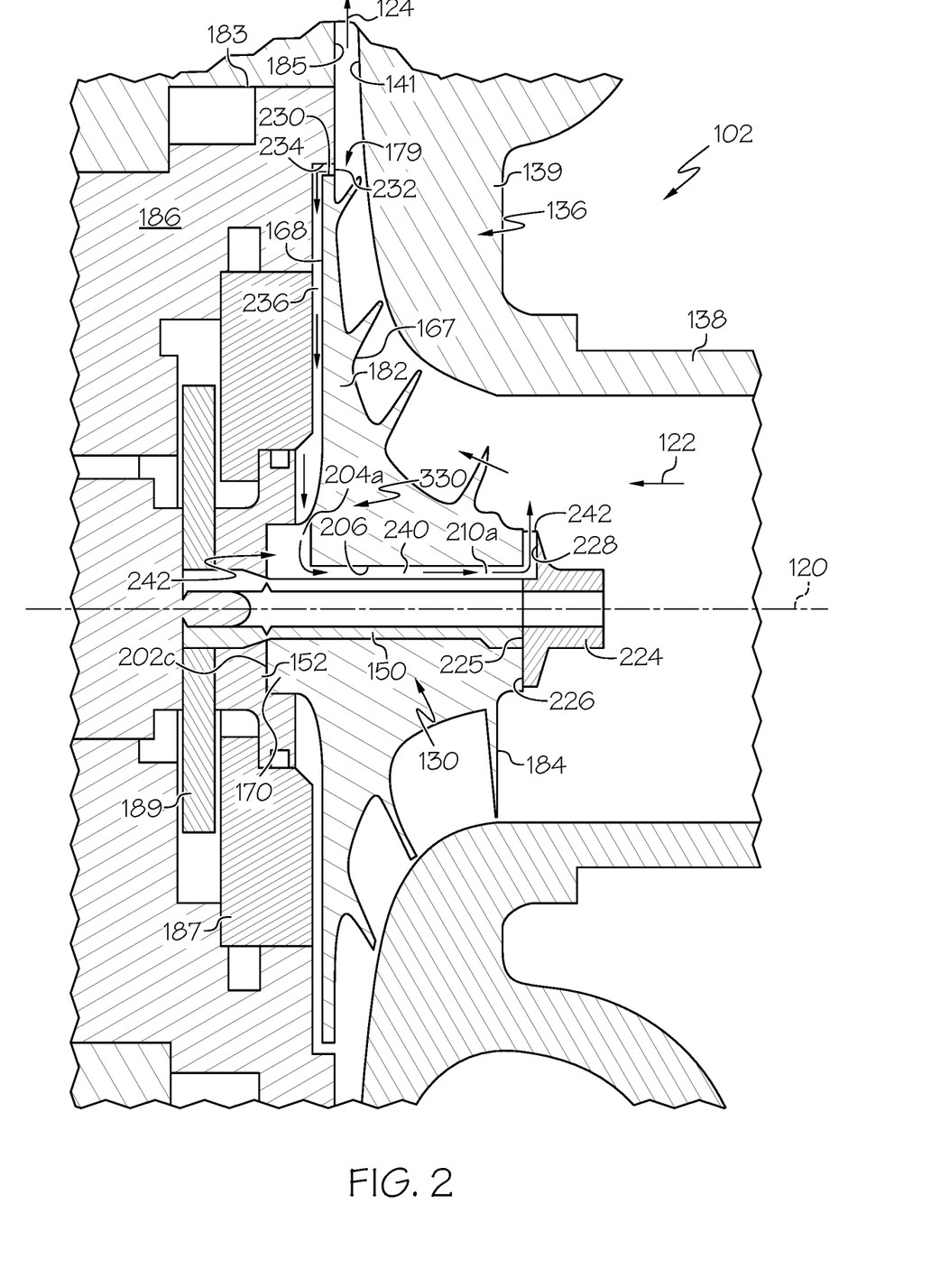
FIG. 2 is a detail section view of the charging device of FIG. 1.
Figure 3:
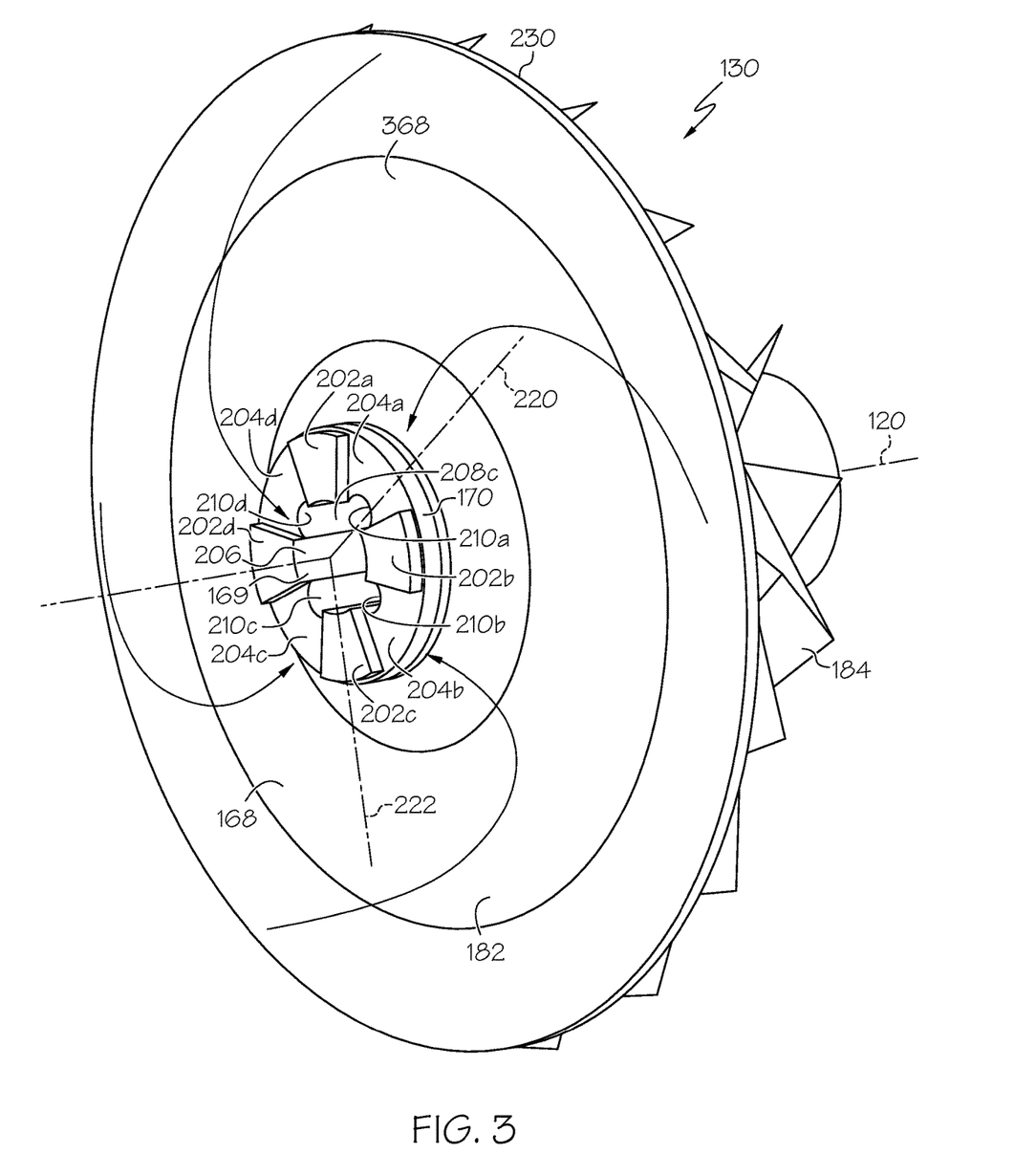
FIG. 3 is a rear perspective view of a compressor wheel of the charging device of FIG. 2.
Figure 4:
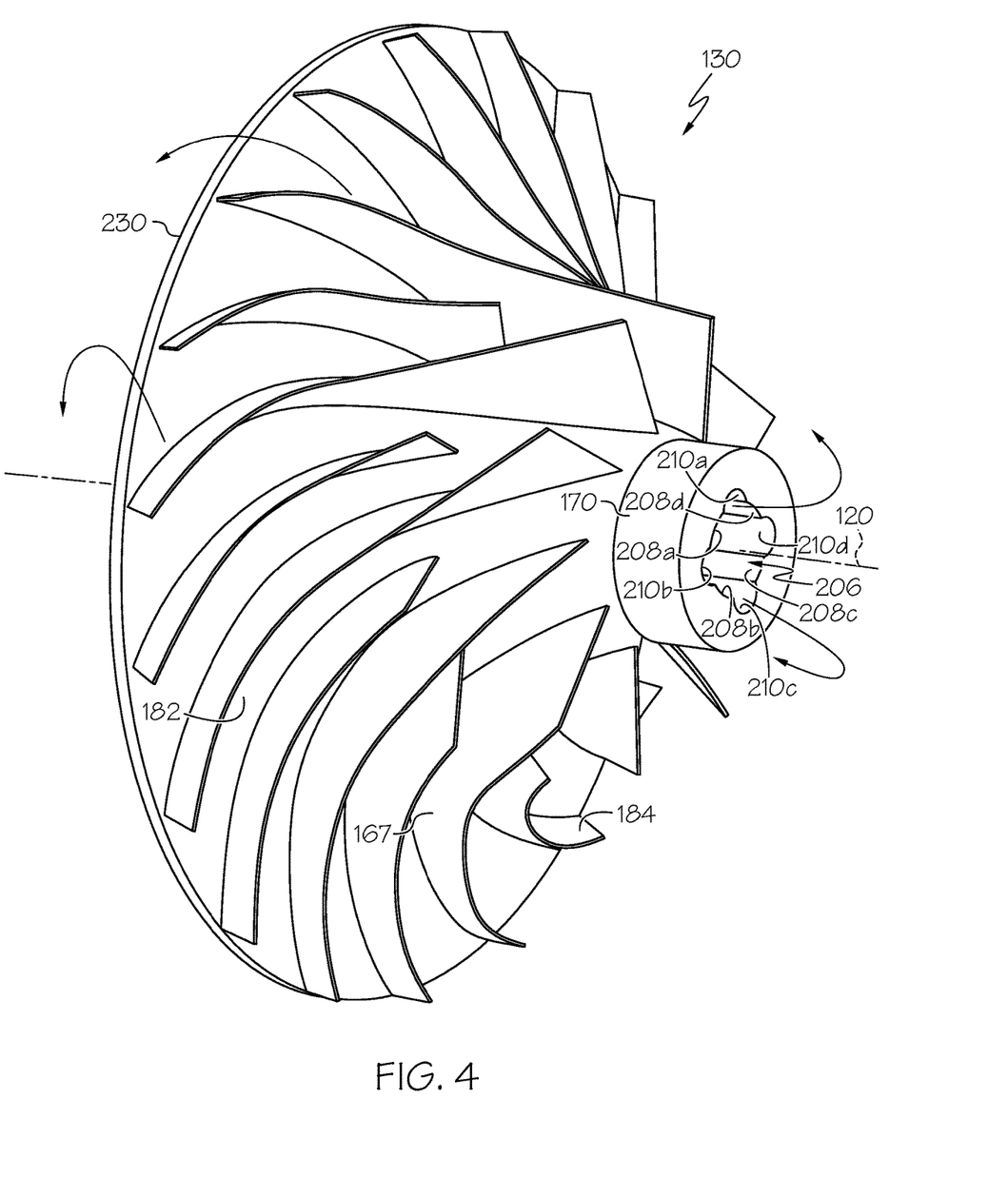
FIG. 4 is a front forward perspective view of the compressor wheel of FIG. 3.

Referring now to FIGS. 2-4, the compressor wheel 130 of the rotating group 118 will be discussed in greater detail according to example embodiments. The compressor wheel 130 may be substantially centered on the axis 120 and fixed to one end of the shaft 150. The compressor wheel 130 may include a front face 167 (FIG. 4) and a back face 168 (FIG. 3). The bulk of the compressor wheel 130 may be defined by a support structure 182. The support structure 182 may frusto-conic or otherwise tapered along the axis 120 from the front face 167 to the back face 168, and the back face 168 may be disposed substantially normal to the axis 120. The back face 168 and the front face 167 may intersect at an outer radial edge 230 of the wheel 130. The front face 167 may include a plurality of blades 184. The blades 184 may be relatively thin members that project from the front face 167. The blades 184 may project radially away from the axis 120. The blades 184 may also extend helically about the axis 120.

The compressor wheel 130 may include a hub 170 that is centered on the axis 120. The hub 170 may project axially from surrounding areas of the back face 168 (FIG. 3) and may project axially from surrounding areas of the front face 167 (FIG. 4). A bore 169 extends axially through the hub 170 and through the wheel 130 from the back face 168 to the front face 167. The bore 169 may be defined by an inner surface, indicated generally at 206. As indicated in FIG. 4, the inner surface 206 may be defined by and may include two or more radial engagement surfaces, such as a first radial engagement surface 208a, a second radial engagement surface 208b, a third radial engagement surface 208c, and a fourth radial engagement surface 208d. The inner surface 206 may also be defined by and may include two or more grooves, such as a first groove 210a, a second groove 210b, a third groove 210c, and a fourth groove 210d. The grooves 210a-210d may separate respective pairs of the engagement surfaces 208a-208d in the circumferential direction about the axis 120. The grooves 210a-210d may extend parallel to the axis 120 and may be spaced evenly (e.g., every ninety degrees) about the axis 120. The grooves 210a-210d may be recessed radially into the hub 170 and recessed from the engagement surfaces 208a-208d in the radial direction. Stated differently, the engagement surfaces 208a-208d may project radially from the intervening grooves 210a-210d. In some embodiments, the engagement surfaces 208a-208d may lie substantially within a common radius relative to the axis 120. The engagement surfaces 208a-208d may be knurled or otherwise textured to grip the shaft 150. The grooves 210a-210d may have a rounded (e.g., semi-circular) cross sectional profile. This cross-sectional profile may remain substantially constant along the axis 120 from the back face 168 to the front face 167.

The hub 170 projects from the back face 168 as shown in FIG. 3. The hub 170 may be defined by and may include two or more engagement surfaces, such as a first engagement surface 202a, a second engagement surface 202b, a third engagement surface 202c, and a fourth engagement surface 202d. The hub 170 may also be defined by and may include two or more apertures, such as a first aperture 204a, a second aperture 204b, a third aperture 204c, and a fourth aperture 204d. The apertures 204a-204d may separate respective pairs of the engagement surfaces 202a-202d in the circumferential direction about the axis 120. The apertures 204a-204d may be spaced evenly (e.g., every ninety degrees) about the axis 120. The apertures 204a-204d may be recessed into the hub 170 axially and recessed from the engagement surfaces 202a-202d in the axial direction. Stated differently, the engagement surfaces 202a-202d may project axially from the intervening apertures 204a-204d. In some embodiments, the engagement surfaces 202a-202d may lie substantially within a common plane (i.e., the engagement surfaces 202a-202d may be co-planar). Furthermore, the engagement surfaces 202a-202d may be wedge-shaped. Likewise, the apertures 204a-204d may be wedge-shaped notches disposed between respective pairs of the engagement surfaces 202a-202d.

Also, the grooves 210a-210d may intersect respective ones of the apertures 204a-204d at the back face 168 as shown in FIG. 3. FIG. 2 illustrates this intersection, for example, between the aperture 204a and the groove 210a. (It will be appreciated that areas of FIG. 2 above the axis 120 represent a section taken along a first plane, which is defined by radial reference line 220 of FIG. 3 and the axis 120. The areas below the axis 120 in FIG. 2 represent a section taken along a second plane, which is defined by radial reference line 222 of FIG. 3 and the axis 120.)

Example embodiments of the housing 119 of the charging device 102 will now be discussed in greater detail with reference to FIGS. 1 and 2. As shown, the housing 119 may include a motor casing 144 that is hollow and cylindrical. The motor casing 144 may extend lengthwise along the axis 120 from one axial end of the compressor section 110. The motor casing 144 may house the stator 146. Thus, the stator 146 may be fixed inside the motor casing 144, whereas the rotor 148 may be fixed on the shaft 150 of the rotating group 118 and may be received within the stator 146.

Moreover, the housing 119 may include a compressor housing member 136, which defines an axial inlet 138, a shroud member 139, and a volute member 140. The axial inlet 138, shroud member 139, and volute member 140 may be attached together in a unitary, one-piece compressor housing member 136. The volute member 140 may be fixedly attached on one end of the motor casing 144 and/or to other portions of the device 102. The axial inlet 138 may be tubular, straight, and centered on the axis 120. The shroud member 139 may be inversely shaped according to the blades 184 of the compressor wheel 130. The shroud member 139 may oppose the blades 184 of the compressor wheel 130 to collectively define a diffuser area 179 of the compressor section 110. The volute member 140 may define a volute passage 142 that extends about the axis 120. The volute passage 142 may be fluidly connected to the diffuser area 179 includes an outlet 143 (FIG. 1) that provides the compressed airstream 124 to the intercooler 128 and, then, to the fuel cell stack 104 as explained above.

As represented in FIGS. 1 and 2, the bearing(s) 121 of the charging device 102 may include air bearings. Accordingly, the bearings 121 may include a first bearing housing 186 disposed on the end of the motor section 112 that is proximate the compressor section 110. The bearings 121 may also include a second bearing housing 196 on an opposite end of the motor section 112. The first bearing housing 186 may be cap-shaped and may support a first journal bearing 188, a thrust bearing 187, and a thrust disc 189, which support rotation of the rotating group 118 relative to the housing 119. As shown in FIG. 1, the first bearing housing 186 may cover over the end of the stator 146. The first bearing housing 186 may further include an outer radial edge 183 that is fixed to the motor casing 144. The outer radial edge 183 may be attached (e.g., sealed) to the compressor housing member 136. As shown in FIG. 2, the first bearing housing 186 may include a flow surface 185 that partly defines the diffuser area 179. In other words, the flow surface 185 of the first bearing housing 186, the front face 167 of the wheel 130, and an inner surface 141 of the shroud member 139 may cooperatively define the diffuser area 179. Thus, the diffuser area 179, along with the inlet 138 and the volute passage 142 may collectively define a compressor flow path for the inlet airstream 122 to be converted to the compressed airstream 124. As shown, the inlet airstream 122 may flow along the compressor flow path axially into the inlet 138, turn radially outward through the diffuser arear 179, and into the volute passage 142. The resultant airstream 124 flows to the intercooler 128 and, then, to the fuel cell stack 104 as explained above.

As shown in FIG. 1, the second bearing housing 196 may extend radially inward from the motor casing 144 and may support a second journal bearing 197, which further supports rotation of the rotating group 118 relative to the housing 119. The second bearing housing 196 may cover over the end of the stator 146.

Additionally, the charging device 102 may further include a first end plate 191. The first end plate 191 may be a thin-walled member that is received within an end flange 156 of the motor casing 144. The first end plate 191 may also cover over the axial end of the stator 146, the motor casing 144, and/or the second bearing housing 196.

Furthermore, the charging device 102 may include a second end plate 198. The second end plate 198 may be a thin-walled member that is received within the end flange 156 of the motor casing 144. The second end plate 198 may cover over the first end plate 191.

The charging device 102 may further include a first seal plate 152 proximate the compressor section 110. The first seal plate 152 may include a bore that receives the shaft 150. The first seal plate 152 may also be received within a bore of the thrust bearing 187. The first seal plate 152 may also be axially disposed between the back face 168 of the compressor wheel 130 and the thrust disc 189. On the opposite end of the shaft 150, the charging device 102 may include a second seal plate 154 (FIG. 1). The second seal plate 154 may include a bore that receives the shaft 150. The second seal plate 154 may also be received within a bore of the second end plate 198.

Also, the charging device 102 may include an outer end plate 200. The outer end plate 200 may be a thin-walled member that covers over the shaft 150, the second seal plate 154, and the second end plate 198. Also, the outer end plate 200 may be fixed to the flange 156 of the motor casing 144.

It will be understood that the housing 119, the bearing 121, and/or the rotating group 118 may include a number of additional components, which are not described in detail. For example, the housing 119 may include a number of fasteners, fluid seals, heat shielding, and/or other components for maintaining efficient and effective operations of the charging device 102.

The bore 169 of the compressor wheel 130 receives the shaft 150. The compressor wheel 130 may be fixed to one terminal end of the shaft 150, in the compressor section 110, with the back face 168 facing the motor section 112. The engagement surfaces 208a-208d may abut and frictionally engage (affix to) the shaft 150. Also, the engagement surfaces 202a-202d may abut and frictionally engage (affix to)

the first seal plate 152. As such, the first seal plate 152 may be a support member that supports the compressor wheel 130 in its fixed position on the shaft 150 as shown in FIG. 2.

As shown in FIGS. 1 and 2, a nut 224 or another retainer may be fixedly (e.g., threadably) attached to the shaft 150, thereby retaining the compressor wheel 130 on the shaft 150. In some embodiments, the nut 224 may include an end 225 that substantially corresponds to the hub 170 of the compressor wheel 130 as illustrated in FIG. 3. Thus, the nut 224 may include two or more wedge-shaped engagement surfaces 226 that are separated by intervening notches 228 or other apertures. Thus, when the nut 224 is fixed to the shaft 150, the engagement surfaces 226 may abut against and engage the hub 170 at the front face 167, thereby compressing the compressor wheel 130 between the nut 224 and the first seal plate 152. Also, when the nut 224 is attached, the notches 226 may intersect respective ones of the grooves 210a so as to be fluidly connected. The shaft 150 may be supported by the bearings 121 for rotation about the axis 120 relative to the housing 119.

Referring now to FIGS. 2-4, the bleed air system 162 will be discussed in detail according to example embodiments. The bleed air system 162 may be defined substantially in the compressor section 110 of the charging device 102.

The bleed air system 162 may include a bleed inlet 232. The bleed inlet 232 may be cooperatively defined by the outer radial edge 230 of the compressor wheel 130 and a radially opposing surface 234 of the housing 119. Specifically, as shown in the embodiment of FIG. 2, the opposing surface 234 may be included on the first bearing housing 186. As such, the bleed inlet 232 may be circular gap between the outer radial edge 230 and the first bearing housing 186 to fluidly connect the bleed air system 162 to the diffuser area 179 of the compressor flow path.

The bleed air system 162 may also include a bleed passage 236. The bleed passage 236 is cooperatively defined by the back face 168 of the compressor wheel 130 and one or more opposing faces of the housing 119 and/or bearing 112. As shown in FIG. 2, the opposing face is collectively defined by the first bearing housing 186, the thrust bearing 187, and the first seal plate 152. Accordingly, the bleed passage 236 may be fluidly connected to the bleed inlet 232 and may extend radially along the back face 168. Bleed air received through the inlet 232 may be received in the bleed passage 236.

Moreover, the bleed air system 162 may also include one or more return channels 240. The return channel(s) 240 may be fluidly connected to the bleed passage 236 at a first fluid junction 242. As shown in FIG. 2, the junction 242 may be cooperatively defined by the aperture 204a, the first seal plate 152, the groove 210a, and the outer surface of the shaft 150. It will be appreciated that similar junctions 242 may be formed at the other apertures 204b-204d and grooves 210b-210d. The return channel 240 may extend axially through the compressor wheel 130 from the back face 168 to the front face 167. In some embodiments, there may be a plurality of return channels 240, each cooperatively defined by the grooves 210a-210d of the compressor wheel 130 and the outer diameter surface of the shaft 150. Each return channel 240 may be defined between the inner surface 206 of the respective groove 210a-210d and the outer surface of the shaft 150. Thus, the return channel 240 may extend axially along the inner surface 206 of the bore 169 (i.e., between the grooves 210a-210d) and the shaft 150.

Also, the return channel 240 may be fluidly connected to the compressor flow path via one or more return inlets 242. In some embodiments, the return inlets 242 may be cooperatively defined by the nut 224, the end of the shaft 150, and the hub 170 of the compressor wheel 130. As shown in FIG. 2, the return channel 240 may extend radially outward from the return channel 240, may turn radially through the notches 228 in the nut 224, and may connect to the compressor flow path at a position upstream of the compressor wheel 130.

Accordingly, the bleed air system 162 may receive bleed air and circulate the fluid from the compressor flow path, through the bleed passage 236 and the return channel 240, back to the compressor flow path via the return inlets 242. It will be appreciated, therefore, that in some embodiments the bleed air system 162 may be a passive and closed system that circulates bleed air from the compressor flow path and back to the compressor flow path.

Thus, during operation of the device 102, the motor 199 may rotate the compressor wheel 130 to compress the inlet airflow 122. Bleed air in the compressor section 110 may flow into the bleed inlet 232, along the back face 168 of the compressor wheel 130 through the bleed passage 236. The bleed air in the bleed passage 236 may pass into the return channels 240 and back to the inlet 138 of the compressor flow path. This bleed air may alleviate, suppress, or otherwise reduce thrust loads (loads directed along the axis 120) on the rotating group 118. For example, the bleed air may escape from the bleed passage 236 along the back face 168 of the compressor wheel 130, thereby limiting pressure build up behind the compressor wheel 130. In other words, the bleed air system 162 may limit a pressure gradient between the front face 167 and the back face 168 of the compressor wheel 130. Accordingly, the rotating group 118 may maintain balanced rotation without significant overall thrust loads. As such, the bearings 121 may be relatively light-duty bearings, such as air bearings, without compromising operation of the charging device 102.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A single-stage compressor device comprising:
a housing;
a rotating group that includes a shaft and a compressor wheel fixed to the shaft, the compressor wheel including a front face and a back face, the front face cooperating with the housing to define a compressor flow path;
a bearing that supports rotation of the rotating group within the housing;
a motor that drives rotation of the rotating group within the housing; and
a bleed system fluidly connected to the compressor flow path and configured to receive bleed fluid from the compressor flow path, the bleed system including a bleed passage, at least a portion of the bleed passage being cooperatively defined by the back face of the compressor wheel and an opposing surface of the housing, the bleed system configured to pass bleed air from the bleed passage, thereby alleviating thrust loading of the compressor wheel on the rotating group.

2. The compressor device of claim 1, wherein the bleed system is configured to circulate fluid from the compressor flow path, through the bleed passage, to a return inlet; and
wherein the return inlet is fluidly connected to the compressor flow path.

3. The compressor device of claim 2, wherein the bleed system includes a return channel that returns the bleed fluid to the return inlet.

4. The compressor device of claim 3, wherein the compressor wheel includes a bore with an inner surface, wherein the bore receives the shaft; and
wherein the return channel is defined between the inner surface of the bore and the shaft and extends along the inner surface of the bore from the bleed passage to the return inlet.

5. The compressor device of claim 3, wherein the bleed passage extends radially between the back face of the compressor wheel and the opposing surface of the housing; and
wherein the return channel extends axially through the compressor wheel from the back face to the front face.

6. The compressor device of claim 3, wherein the compressor wheel includes a bore with an inner surface that includes a first radial engagement surface, a second radial engagement surface, and a groove dividing the first radial engagement surface from the second radial engagement surface;
wherein the compressor wheel is fixedly attached to the shaft with the first and second radial engagement surfaces engaging the shaft; and
wherein the return channel is cooperatively defined by the groove of the compressor wheel and the shaft.

7. The compressor device of claim 6, wherein the groove is one of a plurality of grooves spaced apart substantially evenly about an axis of rotation of the rotating group.

8. The compressor device of claim 3, wherein the rotating group further includes a support member;
wherein the back face of the compressor wheel includes a hub with a first engagement surface, a second engagement surface, and an aperture dividing the first engagement surface from the second engagement surface;
wherein the compressor wheel is fixedly attached to the support member with the first and second engagement surfaces engaging the support member; and
wherein the bleed system includes a first fluid junction cooperatively defined by the aperture and the support member, the first fluid junction fluidly connecting the bleed passage to the return channel.

9. The compressor device of claim 8, wherein the aperture is one of a plurality of apertures spaced apart substantially evenly about an axis of rotation of the rotating group.

10. The compressor device of claim 8, further comprising a retainer that is fixedly attached to the shaft;
wherein the compressor wheel is fixedly attached to the shaft between the retainer and the support member; and
wherein the retainer at least partly defines the return inlet.

11. The compressor device of claim 1, wherein the compressor wheel includes an outer radial edge;
wherein the bleed system includes a bleed inlet cooperatively defined by the outer radial edge and a radially opposing surface of the housing;
wherein the bleed inlet fluidly connects a diffuser area of the compressor flow path to the bleed passage.

12. The compressor device of claim 1, wherein the bearing is an air bearing.

13. The compressor device of claim 1, wherein the rotating group is turbine-less and is configured to be driven in rotation by the motor; and
wherein the bleed system is a passive and closed system that circulates the bleed fluid from the compressor flow path and back to the compressor flow path.

14. A single-stage, motorized compressor device comprising:
a housing;
an electric motor housed within the housing;
a rotating group that includes a shaft and a compressor wheel fixed to the shaft, wherein the rotating group is turbine-less and is configured to be driven in rotation by the motor about an axis of rotation, the compressor wheel including a front face and a back face, the front face cooperating with the housing to define a compressor flow path;
an air bearing that supports rotation of the rotating group within the housing;
a bleed system that includes a bleed passage and a return channel, the bleed passage configured to receive bleed air from the compressor flow path, the return channel configured to return bleed air back toward the compressor flow path, at least a portion of the bleed passage being cooperatively defined by the back face of the compressor wheel and an opposing surface of the housing.

15. The compressor device of claim 14, wherein the compressor wheel includes a bore with an inner surface, wherein the bore receives the shaft; and
wherein the return channel is defined between the inner surface of the bore and the shaft and extends along the inner surface of the bore from the bleed passage to a return inlet, the return inlet being fluidly connected to the compressor flow path.

16. The compressor device of claim 14, wherein the bleed passage extends radially between the back face of the compressor wheel and the opposing surface of the housing; and
wherein the return channel extends axially through the compressor wheel from the back face to the front face.

17. The compressor device of claim 14, wherein the compressor wheel includes a bore with an inner surface that includes a first radial engagement surface, a second radial engagement surface, and a groove dividing the first radial engagement surface from the second radial engagement surface;
wherein the compressor wheel is fixedly attached to the shaft with the first and second radial engagement surfaces engaging the shaft; and
wherein the return channel is cooperatively defined by the groove of the compressor wheel and the shaft.

18. The compressor device of claim 14, wherein the rotating group further includes a support member;
wherein the back face of the compressor wheel includes a hub with a first engagement surface, a second engagement surface, and an aperture dividing the first engagement surface from the second engagement surface;
wherein the compressor wheel is fixedly attached to the support member with the first and second engagement surfaces engaging the support member; and
wherein the bleed system includes a first fluid junction cooperatively defined by the aperture and the support member, the first fluid junction fluidly connecting the bleed passage to the return channel.

19. The compressor device of claim 18, further comprising a retainer that is fixedly attached to the shaft;
   wherein the compressor wheel is fixedly attached to the shaft between the retainer and the support member; and
   wherein the retainer at least partly defines a return inlet that is fluidly connected to the compressor flow path.

20. The compressor device of claim 14, wherein the compressor wheel includes an outer radial edge;
   wherein the bleed system includes a bleed inlet cooperatively defined by the outer radial edge and a radially opposing surface of the housing;
   wherein the bleed inlet fluidly connects a diffuser area of the compressor flow path to the bleed passage.

\* \* \* \* \*